UNITED STATES PATENT OFFICE.

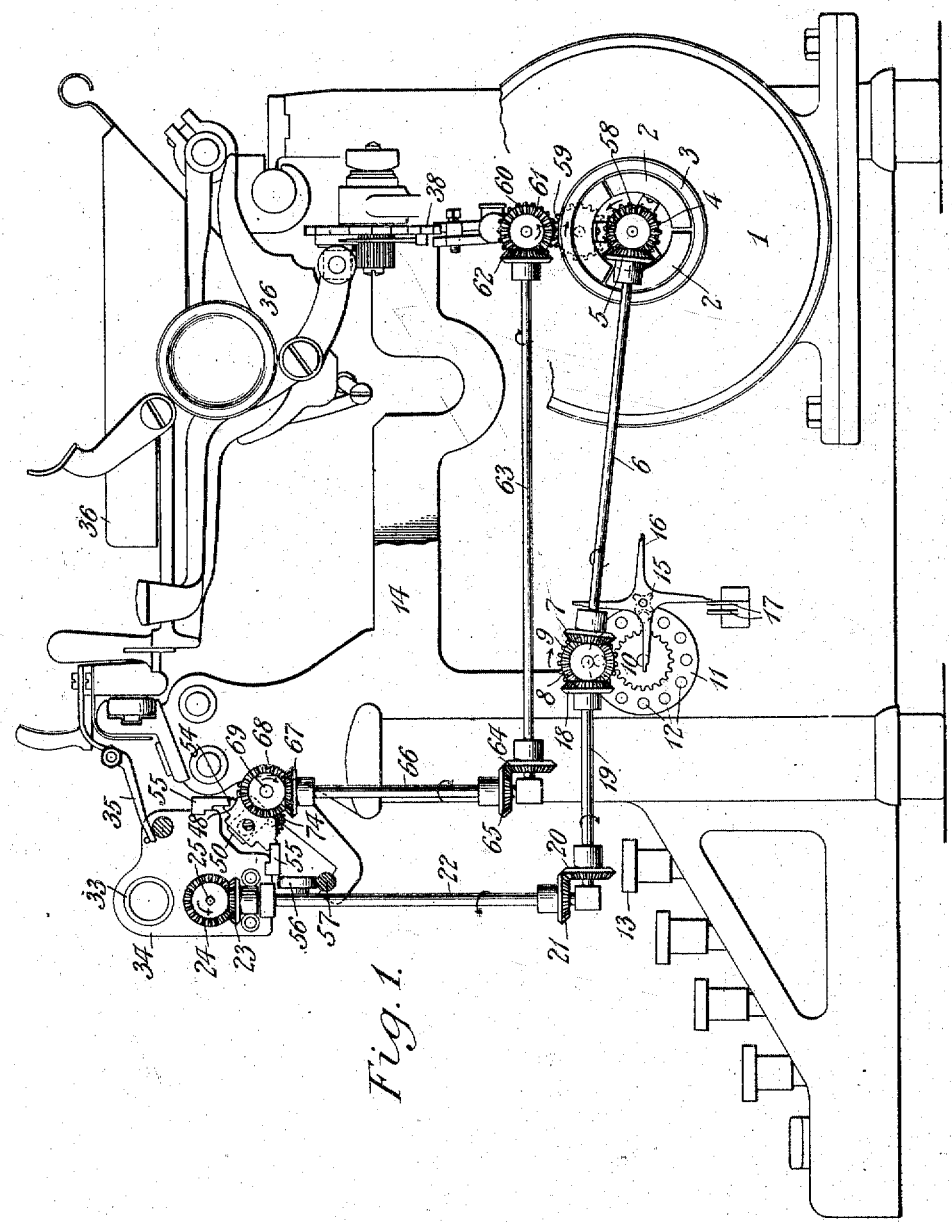

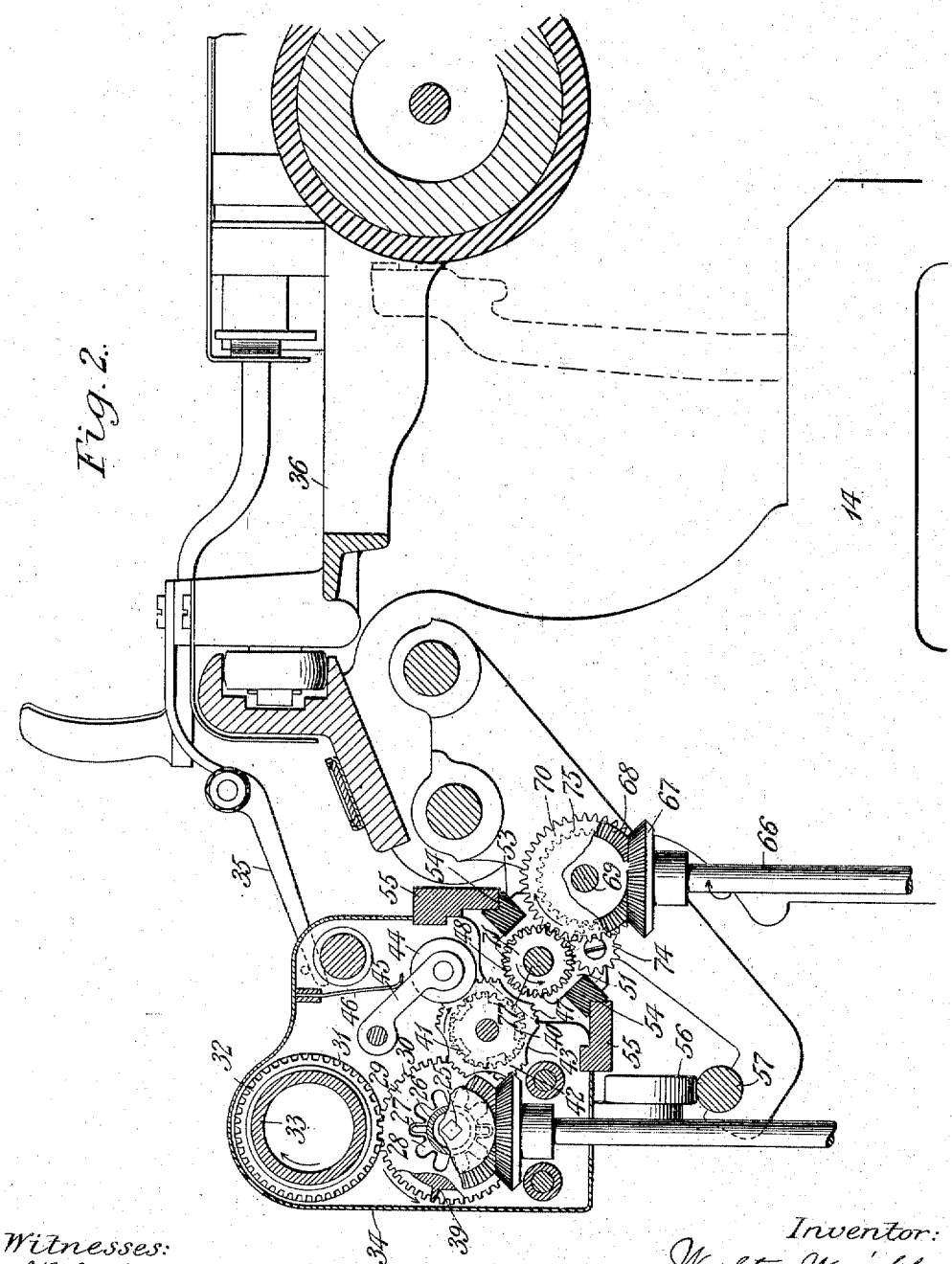

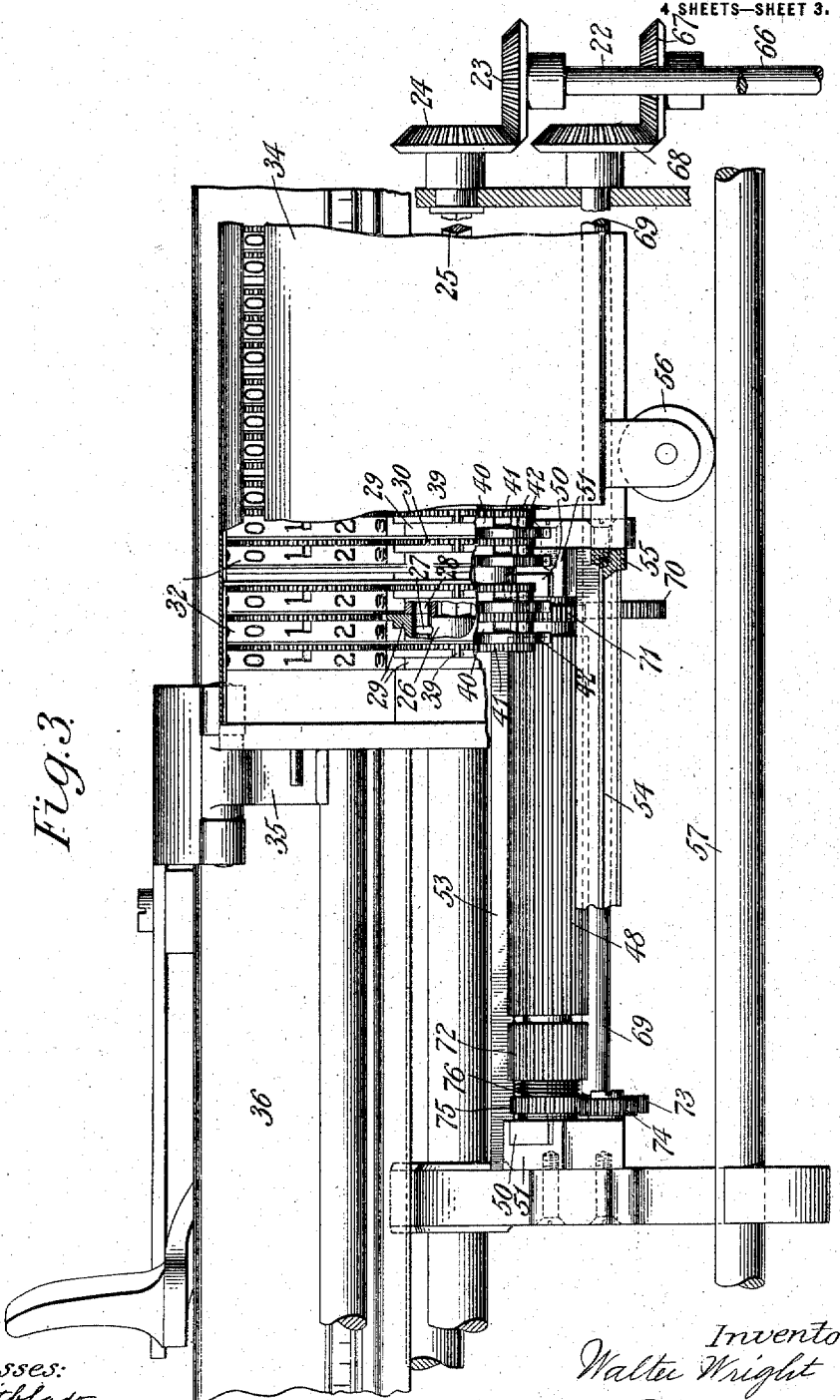

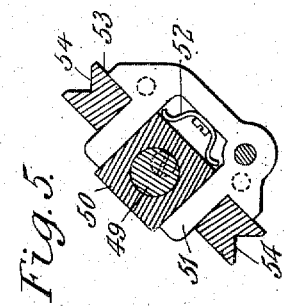
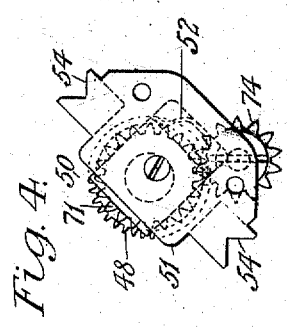
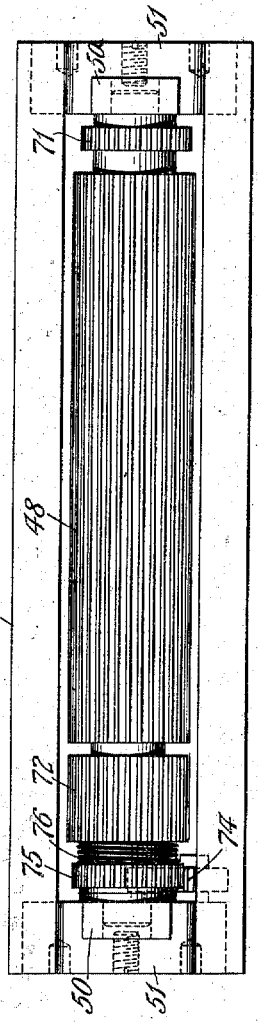
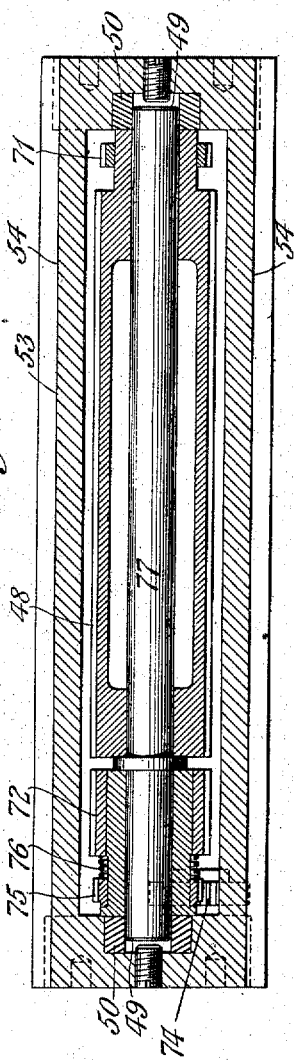

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,259,700.    Specification of Letters Patent.    Patented Mar. 19, 1918.

Application filed February 24, 1911. Serial No. 610,504.

*To all whom it may concern:*

Be it known that I, WALTER WRIGHT, a citizen of the United States, residing in New York, in the county of New York and State of New York, have invented certain new and useful Improvements in Combined Type-Writing and Computing Machines, of which the following is a specification.

This invention relates to computing machines, and particularly those of the class disclosed in pending application No. 543,603, filed February 12, 1910, in which an electric motor is connected to drive a key-controlled master wheel adapted to operate successively the members of a gang of computing wheels; the computing devices including tens-carrying trains, one for each computing wheel; and a power-rotated shaft being employed to assist the tens-carrying trains.

One of the objects of the present invention is to improve the means for assisting the tens-carrying trains, particularly with a view to simplifying the mechanism and rendering it more certain, durable and efficient.

I provide a power-driven assisting barrel or member which is substantially shorter than the length of the gang of computing wheels; whereby the train of tens-carrying mechanism is broken, that is, tens are not carried more than say ten or fifteen points or wheels beyond the point at which the master-wheel is operating, thus reducing the complication, delicacy and expense of the mechanism. The assisting member or barrel operates progressively upon the tens-carrying trains in the same manner and at the same time as the master-wheel is caused to operate successively upon the computing wheels, and preferably the master-wheel and the assisting member remain in one location while the gang of computing wheels advances step by step, being connected for this purpose to the carriage of the typewriter. The invention however is broad enough to include any relative movement between the gang of computing wheels and both master wheel and assisting member. The last is arranged to operate upon the computing wheel of next higher denomination from that with which the master wheel is in engagement. There may be from thirty to one hundred or more computing wheels in the gang, while the assisting barrel may not extend farther than say fifteen wheels, so that economy in construction, assembling, adjustment and operation is effected.

Since, in breaking the tens carrying train at the termination of the aforesaid short assisting member or barrel, there is some liability that a succeeding tens-carrying train may partially operate the wheel of next higher denomination, I provide means for automatically restoring said higher-denomination wheel to initial position.

Other objects and advantages will hereinafter appear.

In the accompanying drawings,

Figure 1 is a side elevation of an Underwood combined typewriting and computing machine, with the present improvements applied thereto.

Fig. 2 is a sectional side elevation taken through the computing mechanism and carriage of the typewriter.

Fig. 3 is a front elevation of the upper right-hand portion of the machine, showing particularly the computing mechanism; parts being broken away.

Fig. 4 is an end elevation of the bracket in which the tens-carrying assisting barrel is mounted.

Fig. 5 is a sectional view of the same.

Fig. 6 is a top view of the tens-carrying assisting barrel and its appurtenances.

Fig. 7 is a sectional view of the same.

Power is furnished for rotating the computing wheels by means of an electric motor 1, which may be in constant operation, and may have a friction clutch 2 to engage a ring 3, which is connected to a pinion 4, meshing with a pinion 5 on shaft 6, the latter carrying a pinion 7 meshing with a pinion 8. Fixed to the pinion 8 is a gear or pinion 9 meshing with a gear 10, which is fixed to a primary escapement valuating or index wheel 11. The latter has pins 12 settable by the numeral keys 13 of the Underwood typewriting machine 14 illustrated in the drawings; said keys having suitable connections to the pins 12, as set forth in said application. Said pins 12 turn a pinion 15, which is connected to a secondary escapement wheel 16, which is let off step-by-step by means of a pair of dogs 17, the latter controlled by numeral keys 13, as set forth in said application.

The train of mechanism extending from the valuating or index wheel 11 to the computing wheels includes pinions 10, 9 and 8, a bevel pinion 18 meshing with 8, shaft 19 carrying pinion 18 and also carrying a pinion 20, a pinion 21 meshing with the latter, a vertical shaft 22 carrying the pinion 21, a pinion 23 on the top of said vertical shaft, and a pinion 24 meshing with 23 and secured upon a horizontal shaft 25, on which is fixed a master wheel 26, the latter having teeth 27 to engage the teeth 28 of an internal gear formed upon a computing wheel 29. Said wheel 29 also has external teeth 30 to mesh with a gear 31 formed upon a number-wheel 32. These number wheels are loosely mounted upon a drum or hollow shaft 33. Said drum and both gangs of wheels are mounted in a carriage 34, which is connected by an arm 35 to the carriage 36 of the typewriter; the latter being power-driven and having a letter-feeding mechanism indicated generally as 38, Fig. 1. The gang of computing wheels 29 advances step-by-step with the paper carriage 36, as the latter is fed by the mechanism 38 at the operation of the numeral keys 13.

The ten-carrying mechanism includes a special tooth 39 upon each computing wheel 29, for engaging and operating once in each revolution of 29 a five-toothed wheel 40, to rotate or start the rotation of the latter. Fixed to this five-toothed wheel 40 are two other wheels or pinions, one of which, numbered 41, is an ordinary pinion, constantly in mesh with the gear 30 of the computing wheel 29 of next higher denomination, to advance the latter one step at the completion of each revolution of the computing wheel 29 of next lower denomination. Also fixed to the five-toothed wheel 40 is a wheel 42 having five lobes. The recesses 43 between these lobes may be occupied by a detent 44, in the form of a roll pivoted upon an arm 45 pressed by a spring 46, whereby the five-toothed wheel 40 is held in the proper relation to the wheel 29 and the special tooth 39 thereon. The pinion 41 is half the diameter of gear 30.

It will be observed that each of the lobes of the wheel 42 is formed on its periphery with gear teeth 47; these sets of gear teeth taken together constituting a mutilated gear, of proper diameter to mesh with the teeth of an elongated assisting pinion or barrel 48. This barrel 48 is preferably in constant rotation; and it will be understood that when the special tooth 39 engages the five-toothed wheel 40, and starts the latter to rotate, the teeth 47 on one of the lobes of the wheel 42 are thrown into mesh with said revolving assisting barrel 48, and the latter forces the three wheels or members 40, 41 and 42, (which are rigidly connected to one another) to continue their rotation in the same direction, and hence to turn the computing wheel 29 of next higher denomination; the teeth 47 finally rotating out of mesh with the barrel 48, and the movements of the driven parts being completed by the spring detent 44, which falls into the next notch in the lobed wheel 42.

To prevent accident in case the teeth 47 are not presented properly to the teeth of the barrel 48, the latter is preferably provided with yielding bearings as seen for instance in Fig. 5. The barrel runs loosely on a shaft 77 having journals 49, supported in a pair of independently movable blocks or boxes 50, the latter mounted to slide in guides or ways 51, and supported in normal positions by springs 52. These springs permit either block 50 to yield, and hence the barrel 48 may yield at either end or at both ends simultaneously. The guides 51 may be mounted on a bar 53 forming part of the framework of the machine, preferably inclined as seen at Fig. 2, and having on its top and bottom edges grooves 54 forming guides or rails for bars or slides 55, fixed upon the carriage 34; said carriage also having one or more rolls 56 running upon a bottom rail 57.

Said barrel 48, which assists in the described manner at the tens-carrying operation, is kept in constant rotation by the electric motor 1, the shaft of which carries a pinion 58 meshing with an idler 59, the latter meshing with a pinion 60, to which is secured a bevel pinion 61, meshing with pinion 52, on shaft 63, the latter carrying a bevel pinion 64 meshing with bevel pinion 65 on vertical shaft 66, having at its upper end bevel pinion 67 meshing with bevel pinion 68 on horizontal shaft 69. On said shaft 69 is a spur gear 70 to mesh with a pinion 71 fixed to the barrel 48.

The gangs of computing and number wheels 29 and 32, and the carriage 34, may be all of great length, and capable of carrying on several sets of computations concomitantly, there being for instance sixty computing wheels and sixty number wheels, to permit numbers to be added in five or more columns at once, each column running into the millions. The barrel 48 however, it will be noted, is relatively short, for the purpose of preventing tens from being carried past a relatively small number of computing wheels, say ten or fifteen. This greatly simplifies the construction and operation of the machine, and reduces the cost of manufacturing and assembling the parts, and also prevents the machine from being subjected to undue strain and wear. The brevity of the assisting barrel 48 is a special advantage when it is constructed of metal and mounted on yielding bearings, as it avoids the difficulty of mounting in such a manner a tens-carrying shaft of great length. Notwithstanding its brevity, the barrel 48 is of ample length for practical purposes, as a computation is seldom carried along for more than ten or twelve wheels in actual practice.

It will be seen at Fig. 3 that the relation between the master wheel 26 and the assisting barrel 48 is such that said barrel cannot connect with the computing wheel which is being actuated by the master wheel, but it connects to the wheel of next higher denomination.

Neither the barrel 48 nor the master wheel travels, in the present instance, with the carriage 36 of the typewriter; but the computing wheel carriage 34 does travel with said carriage 36, to present the computing wheels 29 consecutively to the master wheel 26. The barrel 48 maintains a constant relation to the master wheel; and it will be understood that if the computing wheels 29 should remain stationary and the master wheel 26 should be connected to the paper carriage 36 to travel therewith, as explained in certain of my pending applications, the assisting barrel 48 will then be connected to travel step-by-step with said master wheel. In other words, the master wheel and the barrel 48 taken together may be regarded as one element, and the gangs of computing wheels may be regarded as another element, and these two elements may travel relatively one to the other, for the purpose of enabling the master wheel and the assisting barrel 48 to act progressively upon the computing wheels.

It may happen that the last computing wheel which is at the time actuable by the barrel 48, is caused to complete its entire revolution by the operation of said barrel, and hence the special tooth 39 on such last computing wheel is caused to effect a partial operation of the tens-carrying devices which mesh with the next higher computing wheel, which of course is at this time beyond the range of assisting barrel 48, so that the operation of such higher computing wheel will not be completed, and the corresponding detent 44 may be caused to ride up on the adjacent lobe of the wheel 42 and rest there. I therefore prefer to provide automatic means for returning such higher computing wheel to initial position. This is done by an auxiliary pinion or short barrel 72, which is constantly turning in the opposite direction from 48, and hence, when engaged by the teeth 47 on any five-lobed wheel, will turn or tend to turn the latter backwardly to initial position; both barrels 48 and 72 being freely revoluble in the recesses 43 between the lobes of the wheel 42. In order to avoid accident and to insure proper operation of the parts, the auxiliary reversing barrel 72 is not positively connected with its driver, but is connected thereto by a friction clutch, of such weakness that undue opposition is not offered by said reversing barrel 72 to the movement of the five-lobed wheel 42 when the latter is being impelled by the special tooth 39 of the last computing wheel 29 that is within the range of barrel 48.

There is fixed on the shaft 69 a gear 73, meshing with an idler 74, which drives a pinion 75 concentric with the auxiliary barrel 72, and connected thereto by a friction clutch 76 of any suitable construction; said barrel 72 being loosely mounted on the non-rotating yielding shaft or arbor 77, upon which the main barrel 48 is loosely rotatable, Fig. 7. When the special tooth 39 of the last wheel within the range of the barrel 48 operates the associated tens-carrying train of pinions, the teeth 47 on the latter move into mesh with the auxiliary barrel 72, and because of the employment of the friction clutch 76, said barrel 72 may be stopped and its motion temporarily reversed by said teeth 47, until the active special tooth 39 has pressed the tooth of the five-toothed pinion 40 out of its way and escaped therefrom; whereupon the friction clutch 76 comes into play to cause the auxiliary reversing barrel 72 to resume its natural movement and return the members 42, 41 and 40 to their initial positions, with the detent 44 seated in a recess 43; the number wheel 29 which is in mesh with the restored pinion 41 being of course also restored to its initial position. Hence the train of tens-carrying mechanism is positively broken.

In order to permit the desired yielding movement of the shaft 77 and its journal boxes 50, the teeth of 70, 71, 74 and 75 may be made of extra depth as illustrated, to permit relative movement of meshing gears or pinions. The bodily yielding construction of the auxiliary barrel 72 is also an advantage when the latter engages a set of teeth 47, as it will tend to prevent accident or abrasion of the parts.

Variations may be resorted to within the scope of the invention, and portions of the improvements may be used without others.

Having thus described my invention, I claim:

1. In a computing machine, the combination with a gang of computing wheels, of trains of tens-carrying devices, a rotating assisting member in proximity to said trains but of less length than said gang, a master wheel for operating said computing wheels, means for effecting a relative step-by-step movement between said gang of computing wheels and both said master wheel and said assisting member, and means for preventing tens from being carried beyond the termination of said assisting member.

2. In a computing machine, the combination with a gang of computing wheels, of trains of tens-carrying devices, a rotating assisting member in proximity to said trains but of less length than said gang, a master wheel for operating said computing wheels, means for effecting a relative step-by-step movement between said gang of computing wheels and both said master wheel and said assisting member, and a revolving member in position to engage the tens-carrying devices beyond the termination of said assisting member, to reverse the tens-carrying devices and restore their associated computing wheels to initial positions.

3. In a computing machine, the combination with a gang of computing wheels, of trains of tens-carrying devices, a rotating assisting member in proximity to said trains but of less length than said gang, a master wheel for operating said computing wheels, means for effecting a relative step-by-step movement between said gang of computing wheels and both said master wheel and said assisting member, a revolving member in position to engage the tens-carrying devices beyond the termination of said assisting member, to reverse the tens-carrying devices and restore their associated computing wheels to initial positions, said reversing member provided with means by which it is revolved, and a yielding connection being provided between said reversing member and said revolving means.

4. In a computing machine, the combination with a gang of computing wheels, of trains of tens-carrying devices, a rotating assisting member in proximity to said trains but of less length than said gang, a master wheel for operating said computing wheels, means for effecting a relative step-by-step movement between said gang of computing wheels and both said master wheel and said assisting member, a revolving member in position to engage the tens-carrying devices beyond the termination of said assisting member, to reverse the tens-carrying devices and restore their associated computing wheels to initial positions, said reversing member provided with means by which it is revolved, and a yielding connection being provided between said reversing member and said revolving means, said yielding connection in the form of a slip clutch.

5. In a computing machine, the combination with a gang of computing wheels, of trains of tens-carrying devices, a rotating assisting member in proximity to said trains, but of less length than said gang, a master wheel for operating said computing wheels, means for effecting a relative step-by-step movement between said gang of computing wheels and both said master wheel and said assisting member, a revolving member in position to engage the tens-carrying devices beyond the termination of said assisting member, to reverse the tens-carrying devices and restore their associated computing wheels to initial positions, said reversing member provided with means by which it is revolved; a yielding connection being provided between said reversing member and said revolving means, said yielding connection in the form of a slip clutch, and a single motor connected to both said assisting member and said reversing member.

6. In a combined typewriting and computing machine, the combination of a typewriter carriage, a set of keys, a constantly running motor, computing devices controlled by said keys and driven by said motor, and including a gang of computing wheels and a key-controlled master wheel therefor, trains of tens-carrying devices, a shaft connected to said motor and mounted in yielding bearings, a toothed assisting barrel on said shaft in proximity to said tens-carrying trains, each train including a member movable at the tens-carrying operation into mesh with said barrel, to be driven thereby, said barrel of less length than said gang of computing wheels, and placed to coöperate with the wheel of next higher denomination from that engaged by the master wheel, and means connected to said carriage for moving the gang of computing wheels step-by-step relatively to the master wheel and to said assisting barrel.

7. In a combined typewriting and computing machine, the combination of a typewriter carriage, a set of keys, a constantly running motor, computing devices controlled by said keys and driven by said motor, and including a gang of computing wheels, and a key-controlled master wheel therefor, trains of tens-carrying devices, a shaft connected to said motor and mounted in yielding bearings, a toothed assisting barrel on said shaft in proximity to said tens-carrying trains, each train including a member movable at the tens-carrying operation into mesh with said barrel, to be driven thereby, said barrel of less length than said gang of computing wheels, and placed to coöperate with the wheel of next higher denomination from that engaged by the master wheel, means connected to said carriage for moving the gang of computing wheels step-by-step relatively to the master wheel and to said assisting barrel, a reverse or back gear loosely mounted and in alinement with said assisting barrel, a train of drive gears for said reverse gear or barrel, and a slip clutch between said train of gearing and said reverse gear or barrel.

8. In a combined typewriting and computing machine, the combination of a typewriter carriage, a set of keys, a constantly running motor, computing devices controlled by said keys and driven by said motor, and including a gang of computing wheels, and a key-controlled master wheel therefor, trains of tens-carrying devices, a shaft connected to said motor and mounted in yielding bearings, a toothed assisting barrel on said shaft in proximity to said tens-carrying trains, each train including a member movable at the tens-carrying operation into mesh with said barrel, to be driven thereby, said barrel of less length than said gang of computing wheels, and placed to coöperate with the wheel of next higher denomination from that engaged by the master wheel, means connected to said carriage for moving the gang of computing wheels step-by-step relatively to the master wheel and to said assisting barrel, a reverse or back gear loosely mounted and in alinement with said assisting barrel, a train of drive gears for said reverse gear or barrel, a slip clutch between said train of gearing and said reverse gear or barrel, a shaft upon which are mounted said barrel and said reverse gear, a pinion being fixed to said barrel and forming part of a train of gearing whereby the barrel is connected to said motor, said reverse gear being loosely mounted on said shaft, a pinion being mounted concentrically with said reverse gear and said barrel, and connected by a slip clutch to said reverse gear, and also forming part of a train of gearing whereby said reverse gear is driven constantly in the opposite direction from said barrel.

9. In a combined typewriting and computing machine, the combination of a typewriter carriage, a set of keys, a constantly running motor, computing devices controlled by said keys and driven by said motor, and including a gang of computing wheels and a key-controlled master wheel therefor, trains of tens-carrying devices, a shaft connected to said motor and mounted in yielding bearings, a toothed assisting barrel on said shaft in proximity to said tens-carrying trains, each train including a member movable at the tens-carrying operation into mesh with said barrel, to be driven thereby, said barrel of less length than said gang of computing wheels, and placed to coöperate with the wheel of next higher denomination from that engaged by the master wheel, means connected to said carriage for moving the gang of computing wheel step-by-step relatively to the master wheel and to said assisting barrel, a reverse or back gear loosely mounted and in alinement with said assisting barrel, a train of drive gears for said reverse gear or barrel, a slip clutch between said train of gearing and said reverse gear or barrel, a shaft upon which are mounted said barrel and said reverse gear, a pinion being fixed to said barrel and forming part of a train of gearing whereby the barrel is connected to said motor, said reverse gear being loosely mounted on said shaft, a pinion being mounted concentrically with said reverse gear and said barrel, and connected by a slip clutch to said reverse gear, and also forming part of a train of gearing whereby said reverse gear is driven constantly in the opposite direction from said barrel, said shaft being mounted on yielding bearings.

10. In a combined typewriting and computing machine, the combination of a typewriter carriage, a set of keys, a constantly running motor, computing devices controlled by said keys and driven by said motor, and including a gang of computing wheels and a key-controlled master wheel therefor, trains of tens-carrying devices, a shaft connected to said motor and mounted in yielding bearings, a toothed assisting barrel on said shaft in proximity to said tens-carrying trains, each train including a member movable at the tens-carrying operation into mesh with said barrel, to be driven thereby, said barrel of less length than said gang of computing wheels, and placed to coöperate with the wheel of next higher denomination from that engaged by the master wheel, means connected to said carriage for moving the gang of computing wheels step-by-step relatively to the master wheel and to said assisting barrel, a reverse or back gear loosely mounted and in alinement with said assisting barrel, a train of drive gears for said reverse gear or barrel, a slip clutch between said train of gearing and said reverse gear or barrel, a shaft upon which are mounted said barrel and said reverse gear, a pinion being fixed to said barrel and forming part of a train of gearing whereby the barrel is connected to said motor, said reverse gear being loosely mounted on said shaft, a pinion being mounted concentrically with said reverse gear and said barrel, and connected by a slip clutch to said reverse gear, and also forming part of a train of gearing whereby said reverse gear is driven constantly in the opposite direction from said barrel, a counter-shaft being provided having one gear in mesh with the first-mentioned pinion, and an idle gear driving a second gear on said counter shaft by the last-mentioned pinion.

11. In a computing machine, the combination with a computing wheel, of a carry-over wheel constantly in mesh with an adjoining computing wheel, a tooth on said first computing wheel arranged to strike said carry-over wheel to move it, a constantly rotating wheel arranged to continue the motion of said carry-over wheel to turn said adjoining computing wheel, and resilient journals supporting said constantly rotating wheel.

12. In a computing machine, the combination with a gang of computing wheels, of a carry-over wheel for each of said wheels constantly in mesh with the adjoining wheel, a tooth on each computing wheel arranged to strike its carry-over wheel to move it, a detent holding each carry-over wheel against great motion by its computing wheel, a constantly rotating wheel extending along a limited number of said carry-over wheels, arranged to engage with each carry-over wheel after it is moved by its computing wheel, and before it is arrested by its detent, to rotate the adjoining computing wheel by it, and a second constantly rotating wheel arranged to rotate oppositely to said first rotating member to return any computing wheel to normal position.

13. In a computing mechanism, the combination with a computing wheel, of a carry-over wheel constantly in mesh with an adjoining computing wheel, a tooth on said first computing wheel arranged to strike said carry-over wheel to move it, a constantly rotating wheel arranged to complete the motion of said carry-over wheel, a movable journal supporting said constantly rotating wheel, and a spring arranged to press said journal toward said carry-over wheel.

14. In a computing machine, the combination with a gang of computing wheels and numeral keys, of trains of tens-carrying devices, a rotating assisting member in proximity to said trains but of less length than said gang, a master wheel for operating said computing wheels, means for effecting a relative step-by-step movement between said gang of computing wheels and both said master wheel and said assisting member, and means for preventing tens from being carried beyond the termination of said assisting member.

15. In a computing machine, the combination with an idle shaft supported in resilient bearings, of two gear wheels rotating in opposite directions and supported on said idle shaft, computing wheels, carry-over wheels for said computing wheels, and mutilated gears fast on said carry-over wheels adapted to be driven by said gear wheels.

16. In a computing machine, the combination with a computing wheel, numeral keys and power means for rotating said computing wheel to an extent determined by said keys, of a carry-over wheel constantly in mesh with an adjoining computing wheel, a tooth on said first computing wheel arranged to strike said carry-over wheel to move it, a constantly rotating wheel arranged to continue the motion of said carry-over wheel to turn said adjoining computing wheel, and resilient journals supporting said constantly rotating wheel.

17. In a computing machine, the combination with a computing wheel, numeral keys and power means for rotating said computing wheel to an extent determined by said keys, of a carry-over wheel constantly in mesh with an adjoining computing wheel, a lobe on said carry-over wheel, the latter carrying a tooth arranged to be struck by a tooth on said first computing wheel, and a constantly rotating gear arranged to mesh with teeth on a lobe on said carry-over wheel and to continue the motion of said carry-over wheel to turn said adjoining computing wheel.

18. In a computing machine, the combination with a computing wheel, numeral keys and power means for rotating said computing wheel to an extent determined by said keys, of a carry-over wheel constantly in mesh with an adjoining computing wheel, a tooth on said first computing wheel arranged to strike said carry-over wheel to move it, a detent normally holding said carry-over wheel against motion, a constantly rotating gear arranged to mesh with said carry-over wheel before it is arrested by said detent and to turn it to turn said adjoining computing wheel, and resilient journals supporting said constantly rotating gear.

19. In a computing machine, the combination with a gang of computing wheels and numeral keys, of trains of tens-carrying devices, a rotating assisting member in proximity to said trains, a master wheel for operating said computing wheels, means for effecting a relative step-by-step movement between said gang of computing wheels and both said master member and said rotating assisting member, teeth on said assisting member adapted to engage said carry-over trains when said trains are made effective by their computing wheels, and resilient journals in which said rotating assisting member is journaled.

20. The combination with a gang of computing wheels, of a short assisting member for the tens-carrying trains and breaking the tens-carrying train at the termination of said assisting member, and means for automatically restoring the higher denomination wheel to initial position after the same is partially operated.

21. The combination with a series of computing wheels variably divisible into groups, and carry-over devices normally extending from one group to the next, each group corresponding to a computing unit or totalizer, of carry-over mechanism for said computing wheels including said devices and an assisting member having a capacity limited to a single group of said computing wheels, and means for positively preventing the action of said assisting member on a computing wheel outside of the group served by said assisting member.

22. The combination with a series of computing wheels variably divisible into a plurality of groups, each group corresponding to a single computing unit or totalizer, of tens-carrying mechanism for said computing wheels including individual carry-over trains for each computing wheel and connecting each wheel to both its adjoining wheels, an assisting member common to all of the carry-over trains of a single computing unit or group, and positive means for nullifying the carry-over action of a carry-over train from one computing wheel in the group served by said assisting member to the next higher computing wheel outside of the group served by said assisting member.

23. The combination with computing wheels and carry-over devices therefor, of an assisting member for driving said carry-over devices turning in one direction, and an auxiliary member turning in the opposite direction to said assisting member to eliminate an undesired action due to said assisting member.

24. The combination with computing wheels and carry-over devices therefor, of an assisting member for driving said carry-over devices turning in one direction, an auxiliary member turning in the opposite direction to said assisting member, to eliminate an undesired action due to said assisting member, and a slip clutch for said auxiliary member.

25. In a computing machine, the combination with an idle shaft supported in resilient bearings, of two gear wheels rotating in opposite directions, and supported on said shaft, computing wheels, carry-over wheels for said computing wheels, mutilated gears fast on said carry-over wheels and adapted to be driven by said gear wheels, a motor for driving said gear wheels, a positive train of gears from said motor to one of said gear wheels, and a train of gearing from said motor to the other of said gear wheels including a friction clutch.

26. The combination with a series of computing wheels and carry-over trains therefor, of an assisting device in the form of a barrel pinion universal to said trains; each train comprising a pinion meshing with the computing wheel of next higher denomination, and also comprising a member to be engaged by a driving part on its associated computing wheel, to initiate the movement of the train, and further comprising a mutilated pinion for meshing with the teeth of said assisting pinion.

27. The combination with a series of computing wheels and carry-over trains therefor, of an assisting device in the form of a barrel pinion universal to said trains; each train comprising a pinion meshing with the computing wheel of next higher denomination, and also comprising a member to be engaged by a driving part on its associated computing wheel, to initiate the movement of the train, and further comprising a mutilated pinion for meshing with the teeth of said assisting pinion, provision being made for relative yielding movement between the assisting pinion and the mutilated pinion.

28. The combination with a set of computing wheels and trains of carry-over devices therefor, including a set of pinions, of an assisting pinion universal to said pinions to mesh with one or more thereof at the carry-over operation, and supporting means for said assisting pinion, said supporting means being displaceable to accommodate the assisting pinion to the carry-over pinions.

29. The combination with computing keys, a gang of computing wheels and carry-over trains therefor, of an assisting device effective at the key-strokes and common to all the carry-over trains and normally out of engagement therewith, and means on each computing wheel to initiate the movement of its associated carry-over train, to engage the same with said assisting device, the latter having means for interlocking with the carry-over trains, to drive and positively control the same.

WALTER WRIGHT.

Witnesses:
PAUL ZIRON,
F. D. AMMEN.

Copies of this patent may be obtained for five cents each, by addressing the "Commissioner of Patents, Washington, D. C."